United States Patent
Lagrange et al.

(10) Patent No.: US 8,355,547 B2
(45) Date of Patent: Jan. 15, 2013

(54) ULTRASONIC IMAGING APPARATUS WITH ADAPTABLE SPATIAL IMAGE COMBINATION

(75) Inventors: Jean-Michel Lagrange, Moissy-Cramayel (FR); Claude Cohen-Bacrie, Manhattan, NY (US); Claire Levrier, Rueil-Malmaison (FR); Nicolas Villain, Clamart (FR); Robert R. Entrekin, Kirkland, WA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1634 days.

(21) Appl. No.: 10/525,132

(22) PCT Filed: Aug. 5, 2003

(86) PCT No.: PCT/IB03/03365
§ 371 (c)(1),
(2), (4) Date: Feb. 16, 2005

(87) PCT Pub. No.: WO2004/019058
PCT Pub. Date: Mar. 4, 2004

(65) Prior Publication Data
US 2005/0288580 A1 Dec. 29, 2005

(30) Foreign Application Priority Data
Aug. 21, 2002 (FR) .................................. 02 10453

(51) Int. Cl.
*G06K 9/00* (2006.01)
(52) U.S. Cl. .................................................... 382/128
(58) Field of Classification Search .......... 382/128–132, 382/199, 203, 282, 284; 600/437
See application file for complete search history.

(56) References Cited

U.S. PATENT DOCUMENTS

| 5,522,390 A | * | 6/1996 | Tuithof et al. | 600/410 |
| 5,779,641 A | * | 7/1998 | Hatfield et al. | 600/443 |
| 5,920,657 A | * | 7/1999 | Bender et al. | 382/284 |

(Continued)

FOREIGN PATENT DOCUMENTS
WO  WO 01/69282 A2  9/2001

OTHER PUBLICATIONS

D. F. Leotta et al; "Three-Dimensional Spatial Compounding of Ultrasound Scans With Incidence Angle Weighting", IEEE Ultrasonics Symposium, NY, vol. 2, Oct. 17, 1999, pp. 1605-1608, XP002181820.

(Continued)

*Primary Examiner* — Vikkram Bali

(57) ABSTRACT

An ultrasonic imaging apparatus using a method for combining CMB images of the same object including a step of seeking representative contours CNT of an interface on the images to be combined IM,[I], IM[J] is disclosed. The step is intended to define interest areas IA[I], IA[J] in the vicinity of the representative contours. The method also includes analyzing the interest areas IA[I], IA[J] being intended to allocate weights W[I], W[J] to the points on the interest areas IA[I], IA[J] and to the points corresponding to the interest areas IA[I], IA[J] on the various images. The method also includes constructing a combination image $IM_C$, a point on the combination image $IM_C$ corresponding to a point on at least one interest area IA being obtained from a weighting of the corresponding points on the images to be combined IM[I], IM[J] according to the weights W[I], W[J] allocated in the analysis step ANA.

12 Claims, 4 Drawing Sheets

U.S. PATENT DOCUMENTS

Figure 1:
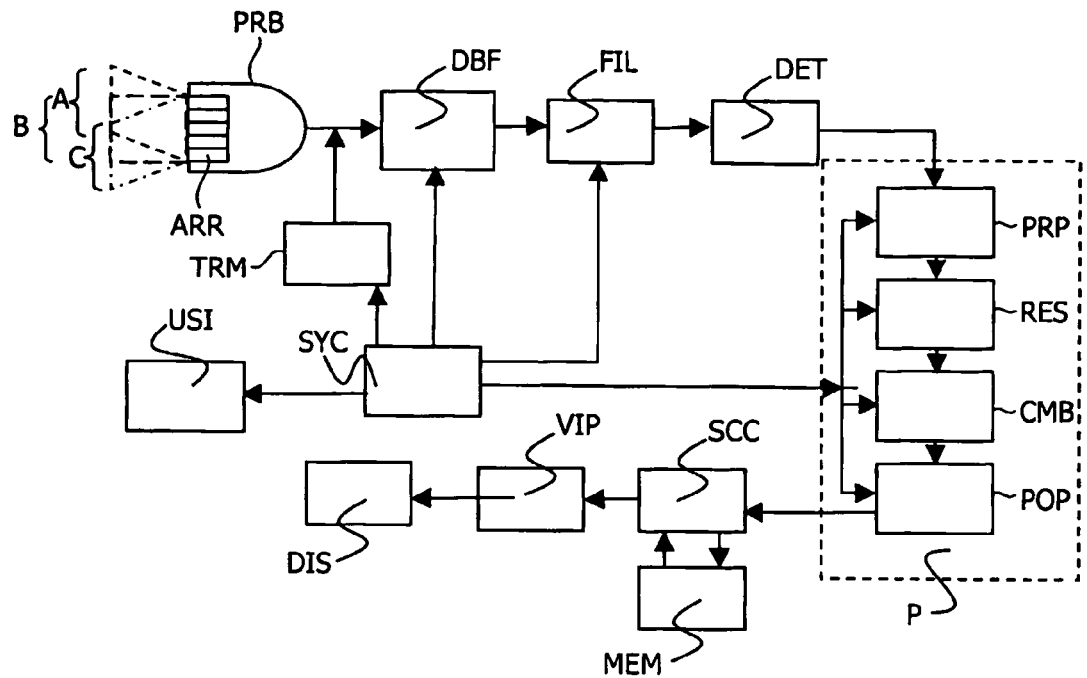

| | | | |
|---|---|---|---|
| 6,101,238 A | 8/2000 | Murthy et al. | |
| 6,126,598 A | 10/2000 | Entrekin et al. | |
| 6,364,835 B1* | 4/2002 | Hossack et al. | 600/443 |
| 6,390,980 B1 | 5/2002 | Peterson et al. | |
| 6,442,289 B1* | 8/2002 | Olsson et al. | 382/128 |
| 6,511,426 B1* | 1/2003 | Hossack et al. | 600/437 |
| 6,544,177 B1* | 4/2003 | Robinson | 600/443 |
| 6,554,770 B1* | 4/2003 | Sumanaweera et al. | 600/443 |
| 6,721,446 B1* | 4/2004 | Wilensky et al. | 382/162 |
| 7,400,757 B2* | 7/2008 | Jolly et al. | 382/131 |
| 2002/0120195 A1* | 8/2002 | Hossack et al. | 600/443 |
| 2003/0195421 A1* | 10/2003 | Demers et al. | 600/437 |
| 2004/0006266 A1* | 1/2004 | Ustuner et al. | 600/407 |

OTHER PUBLICATIONS

"Interactive Segmentation with Intelligent Scissors", Eric N. Mortensen and William A. Barrett, Graphical Models and Image Processing, 60, pp. 349-384, 1998.

* cited by examiner

ACQUISITION A

ACQUISITION B

ULTRASONIC IMAGING APPARATUS WITH ADAPTABLE SPATIAL IMAGE COMBINATION

The invention relates to ultrasonic imaging, for example medical. In particular, the invention relates to a method for combining images in order to form a combination image in two or three dimensions. In such spatial combination methods, the imaged object can be a plane, and therefore in two dimensions, or a volume and therefore in three dimensions.

The patents U.S. Pat. No. 6,126,598 and U.S. Pat. No. 6,390,980 describe apparatus and methods for producing spatial combinations of ultrasonic images in real time. Spatial combination is an imaging technique according to which the echoes of a target obtained from multiple points or in multiple insonification directions are mixed in a single so-called combination image by combining the data, for example by averaging or linear or non-linear filtering. The combination image generally has a lower noise (speckle) and a better definition or continuity of the 2D or 3D structures than conventional ultrasonic images produced from a single insonification direction. In two dimensions, several images are thus obtained for the same position of an array of transducer elements by varying the angle of the ultrasonic beam with respect to the array. The combination of images is then equivalent to a time averaging, the insonification directions being sounded one after the other for the same position of the array.

Many techniques have been proposed for extending the principle to data in three dimensions. Amongst these techniques, the patent application WO01/69282 can be cited, which proposes to use an acquisition of ultrasonic images by means of a linear array moving stepwise in a direction perpendicular to the image planes. By multiplying the movement directions of this 1D array, it then becomes possible to acquire several ultrasonic volumes imaging the same environment. The imaged object is then a volume. After having realigned the various volumes with each other, for example using data from a position sensor, a combination of these various volumes is then possible in order to form a combination volume. Compared with a single acquisition of a volume, this combination volume offers a better signal to noise ratio and increases the definition and continuity of the 2D or 3D structures of the environment observed. Naturally, for purposes of display for example, this combination can be made only in one particular plane. The technique of acquiring three-dimensional data described above makes it possible to easily image the environment in a particular cutting plane. For example, an interpolation is carried out from the acquisition of the echographic volume. The various volumes acquired by scanning the environment with various directions of movement of the linear array therefore make it possible to easily obtain various images of the environment in the same given cutting plane and thus to construct a combination image in this cutting plane. A simple and conventional spatial combination operation consists simply of carrying out an averaging of these images.

The invention relates to the following considerations:

In the prior art WO01/69282, the targets in a volume are observed in several directions, for example n directions. Images with various resolutions are then combined since the 2D or 3D image of a localized reflector (that is to say the function of the response of the imaging system to a pulse) is highly anisotropic. This results from the physical characteristics of the probe and of the type of insonification, focusing and channel formation used. Because of the 3D data acquisition technique described above, this response of the system is highly dependent on the direction of movement of the linear acquisition array. Thus a contour or a part of a contour may be better visible or only visible and clearly delimited on a particular image.

After combination of the various acquisitions of the environment with several directions of movement of the probe, the combination image has a more isotropic resolution or an average definition of the contours since an average response of the system is thus synthesized. However, the best resolution or the best contour definition exhibited by at least one of the combined images (for example the one which belongs to one of the planes acquired by the array and which has the quality of a conventional echographic image) is not preserved. This is detrimental to the combination image finally obtained.

One aim of the invention is to profit from the noise reduction by mixing the various images whilst preserving the best possible resolution and the greatest possible definition or continuity of the structures obtained. Thus one aim of the invention is to avoid losing the qualities of a particular image within the images to be combined.

In fact, a method for combining images in accordance with the introductory paragraph is characterized according to the invention in that it includes the steps of:
  seeking contours representing an interface on the images to be combined, said search step being intended to define interest areas close to said representative contours,
  analyzing interest areas, said analysis step being intended to allocate weights to the points in said interest areas and to the points corresponding to said interest areas on the various images to be combined,
  constructing a combination image, a point on the combination image corresponding to a point on at least one interest area being obtained from a weighting of the corresponding points on the images to be combined, said weighting using the weights allocated in said analysis step.

The result is that the best data are favored by the choices of weighting in the presence of anatomical structures detected as contours. Thus no anatomical structure is lost or excessively attenuated. Outside the areas where structures are present, the image is of good quality since the conventional combination makes it possible to average the images and therefore to reduce the noise, which is also averaged. The principle according to the invention can be extended to any integer number of images.

The analysis step advantageously includes means of determining the characteristics of the interest areas. These determination means can be independent or combined with each other. A certain number of embodiments of the invention correspond to these various determination means.

In a first embodiment, the analysis step uses a detection of the similarities between the interest areas. This similarity is directly used for determining the weights. For example, this makes it possible for a contour detected on a single image and which consequently would disappear in an average of the images not to be affected by the combination. For example, the weights will then all be zero for the corresponding points on the images distinct from the one where it was detected.

In an advantageous embodiment, the analysis step uses a study of the contrast within the interest areas. In particular, the contrasts of the contours are thus evaluated and used for calculating the weights. The weights can then be determined quantitatively according to the value of a confidence factor of the interest area determined from the contrast study.

Finally, in a preferred embodiment, particularly advantageous for an acquisition of images carried out according to the principles presented in patent application WO01/69282, the analysis step uses a study of the resolution. For such an acquisition, the images exhibit in fact different resolutions and it may be judicious to favor the images for which the resolution is the best.

Any other possible criterion for judging the quality of a contour representing an interface can also be chosen. It will be understood here that the image combination takes the best of each of the images in order to form the global combination image. Outside the anatomical structures, the noise is conventionally reduced by averaging and, on the structures, a better visual impression is obtained.

The invention can therefore be implemented in any apparatus intended to carry out a spatial combination of images of an environment. It consequently relates to a device intended to be integrated in an ultrasonic imaging apparatus including means for performing the steps of the method presented above.

In one of its applications, the invention therefore relates particularly to the medical field, where high-precision images are guarantees of a correct and refined diagnosis.

The invention will be further described with reference to examples of embodiments shown in the drawings to which, however, the invention is not restricted.

Figure 2:
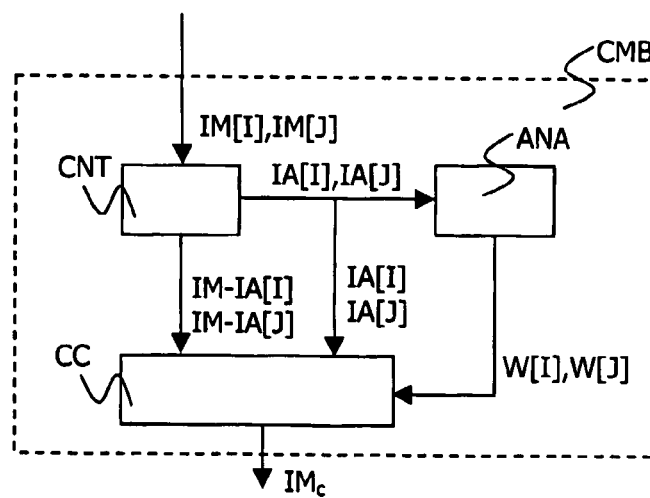
Figure 3:
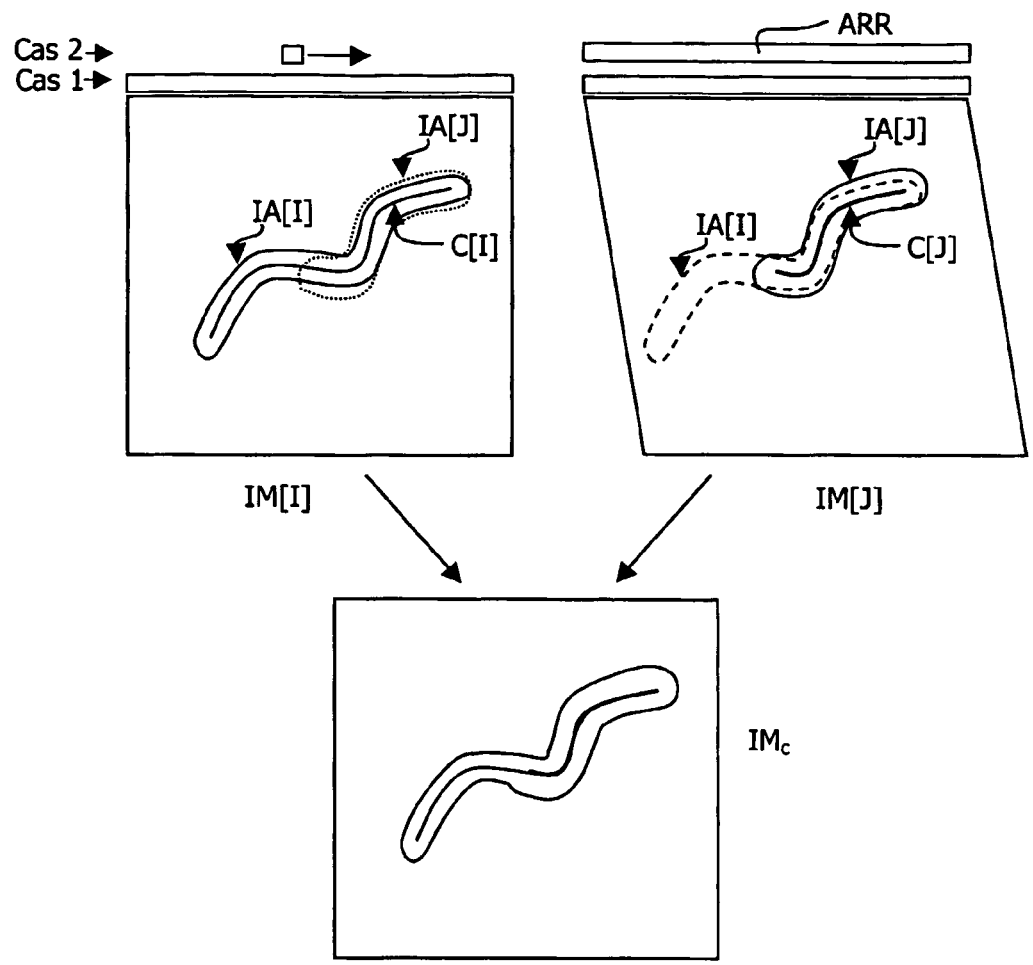
Figure 4:
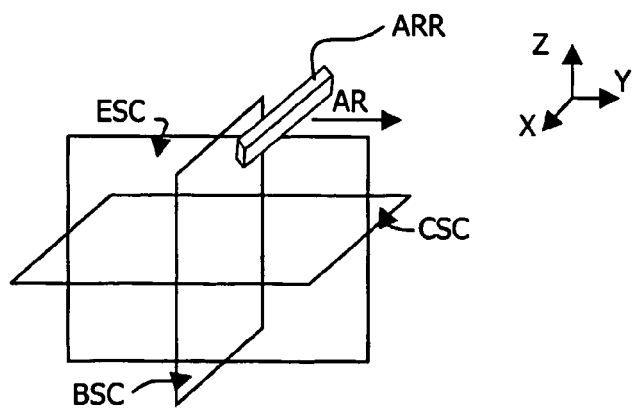
Figure 5A:
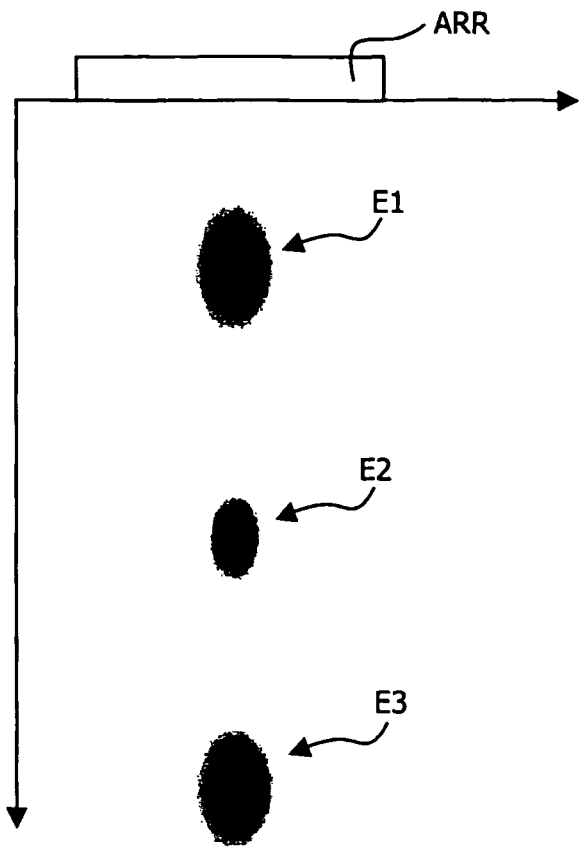
Figure 5B:
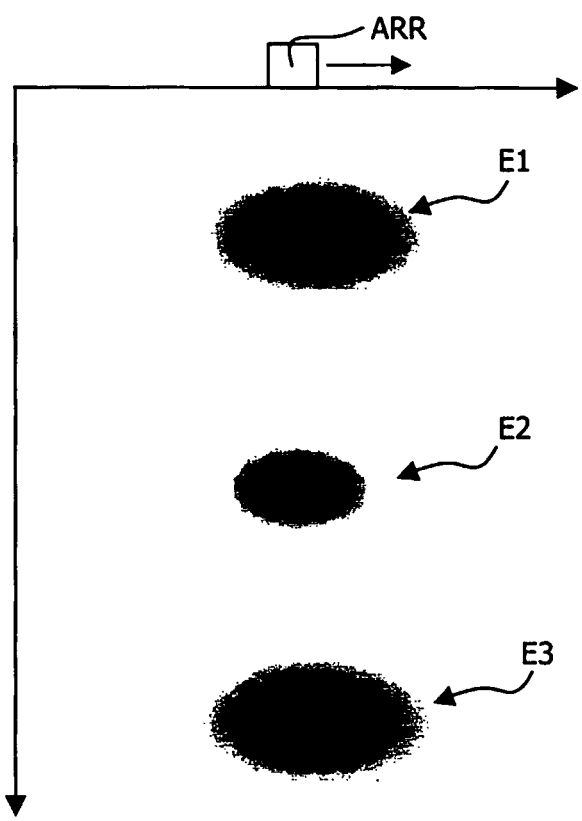
Figure 6A:
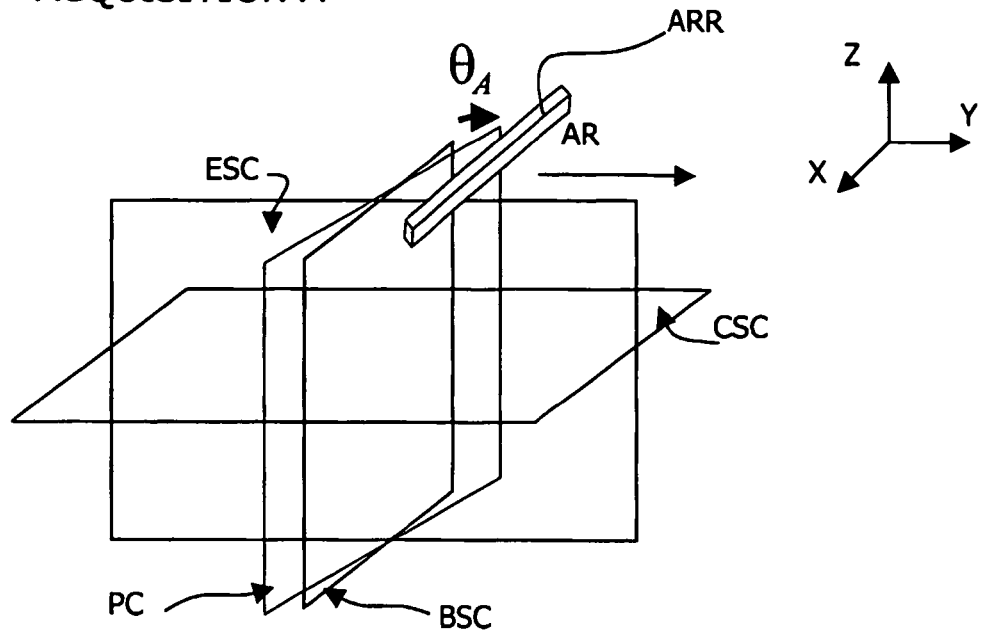
Figure 6B:
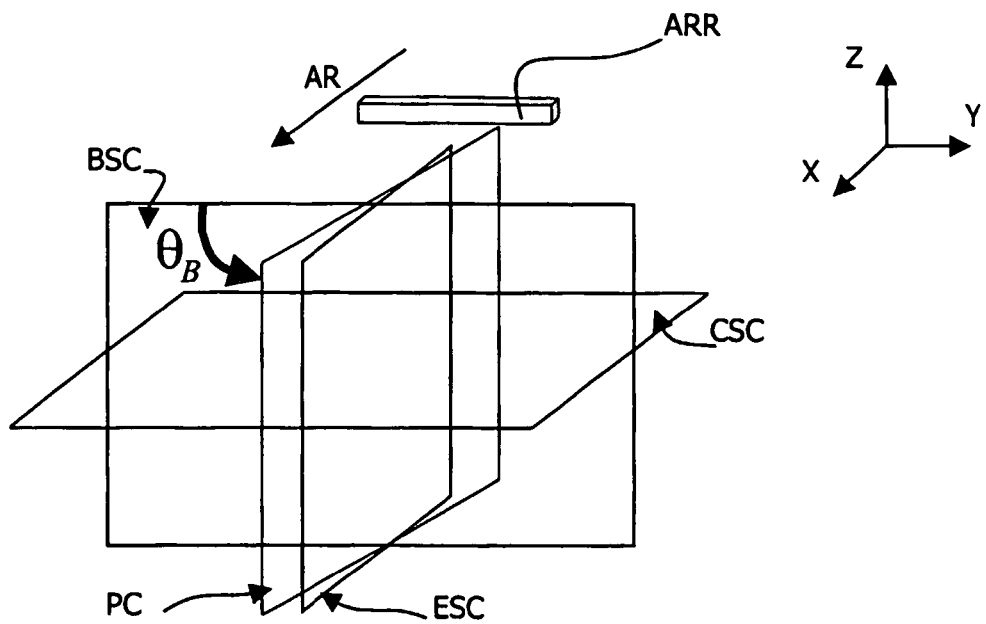

FIG. 1 is a schematic diagram of an ultrasonic apparatus in which the invention is advantageously implemented, FIG. 2 is a schematic diagram of a processor intended to carry out a method according to the invention, FIG. 3 is an illustration on an example of the effects of a method according to the invention on a combination of images, FIG. 4 presents examples of techniques for acquiring images in two dimensions for reconstructing a volume, FIGS. 5a and 5b illustrate two orthogonal sections of the response function at a point or response function of the system, one section being made in the plane of the probe and the other in an orthogonal plane taken in the direction of movement of the probe, FIGS. 6a and 6b present two alternative types of acquisition of images to be combined according to a method in accordance with the invention.

The description which follows is presented so as to enable a person skilled in the art to implement and make use of the invention. This description is provided in the context of the patent application and its requirements. Various alternatives to the preferred embodiment will be obvious to persons skilled in the art and the generic principles of the invention disclosed here can be applied to other embodiments.

Thus the present invention is not deemed to be limited to the embodiments described but rather to have the broadest scope in accordance with the principles and characteristics described below.

The following remarks concern the reference signs. Similar entities are designated by identical letters in all the Figs. Several similar entities can appear in a single Fig. In this case, a digit or a suffix is added to the reference by letters in order to distinguish similar entities. The digit or suffix may be omitted for reasons of convenience. This applies to the description and to the claims.

FIG. 1 depicts an ultrasonic imaging system in which the present invention is advantageously implemented. A probe PRB including an array ARR of transducers makes it possible to insonify an environment. An appropriate emission and an adapted channel formation, as described for example in patent WO01/69282, make it possible to reconstruct a radio-frequency signal (RF signal) for various angles of insonification of the environment and thus to obtain image fields depicted by a rectangle and parallelograms in dotted lines.

Three groups of insonification lines are indicated in the Fig. and denoted A, B and C, each group being inclined at a different angle with respect to the probe PRB. The emission of the beams is controlled by a transmitter TRM which controls the phase shift and duration of activation of each element of the array ARR of transducers: this makes it possible to emit each beam at a given origin on the array of transducers and at a predetermined angle. The signals received by the elements of the array ARR of transducers are digitized by an analog to digital converter and injected into a digital channel formation module DBF. The digital channel formation module DBF delays and adds the echoes received on each element of the array in order to form a sequence of coherent echographic samples focused along each echographic line. The transmitter TRM and the channel formation module DBF are controlled by the system controller SYC responding to the adjustments supplied by an operator via a user interface USI. The control module of the system SYC controls the transmitter TRM so as to transmit the required number of groups of insonification lines at the required angles, in the desired energy ranges and at the desired frequencies. The system controller SYC also controls the digital channel formation module DBF so as to correctly delay and combine the echoes received for the apertures and image depths used. The echo signals are filtered by a programmable digital filter FIL, which defines a frequency band of interest, and then transmitted to the detector DET which extracts the envelope of the signal and supplies the amplitude of the latter. According to the principle of the present invention, the digital echo signals are processed by spatial combination in a processor P. The digital echo signals are first of all preprocessed by a preprocessor PRP. The preprocessor PRP can if necessary weight the signal samples with a weighting factor which depends on the number of images used. The preprocessor can also weight the points situated on the edges of the superimposed images so as to smooth the transitions at which the number of combined samples or images changes. The preprocessed signal samples can then undergo a resampling in a resampler RES. The resampler RES can realign in space the data of an image or the pixels of an image on the display space. Next, the images are combined in a combination module CMB. The combination can comprise a sum, a mean, a peak detection or other combination means. The invention is advantageously implemented in this combination module CMB. Finally, a post-processing is carried out by a post-processor POP. The post-processor POP corrects the dynamic range of the values combined in a range of values compatible with the display. The post-processing can easily be implemented by means of look-up tables (LUT) and can simultaneously carry out compression and standardization so that the combined values are suitable for display. In order to ensure compatibility between the image sizes issuing from the module POP and the sizes acceptable to the display module DIS and the video card VIP, the combined images are reinterpolated in a scan-converter SCC and, for example, stored in a memory MEM. After scan-conversion, the spatially combined images are processed for display by a video processor VIP and displayed on image display means DIS.

FIG. 2 presents an embodiment of a combination module CMB for implementing a method according to the invention. This combination module defines a device intended to be used in an ultrasonic imaging apparatus according to the invention. The combination module CMB receives the data of several images. For reasons of simplification of the description, the data of only two images IM[I], IM[J] are presented at the input of the combination module CMB. These data have advantageously undergone a first conventional preprocessing as described above. In this Fig. and the following ones, the various notations designate generically, for each image and for each pixel or voxel: the interest areas IA corresponding to the presence or not of structures in the images, and the weights W allocated to each pixel or voxel of each image before the combination step generating the image $IM_C$. The indices [I] and [J] make it possible to distinguish the two input images of the combination process CMB.

The description of this embodiment will be given for an imaged object of a flat nature and therefore images in two dimensions. FIG. 3 gives an illustration of two images advantageously processed according to an image combination method according to the invention. The two images depicted in FIG. 3 can result from various kinds of acquisition of an image of the environment.

In a first application of the invention, the two images IM[I] and IM[J] are acquired for the same position of the array and for various insonification angles. The array ARR is then positioned according to Case 1 depicted in FIG. 3 by an array situated in the plane of each of the two images.

In a second application of the invention, the two images IM[I] and IM[J] are extracted from two three-dimensional acquisitions as described in the patent application WO01/69282: they then correspond to the same section through two echographic volumes. As a general rule, these images result from an interpolation of the data issuing from each 3D volume and do not correspond to a section acquired during the movement of the linear array. The two images (or more if scans are available in other directions) correspond to the same physical plane and can therefore be combined according to the methods described for example in patent application WO01/69282. FIG. 4 illustrates the choice of such cutting planes in particular cases where the cutting plane is parallel or orthogonal to the plane of the probe. In FIG. 4, the array ARR being oriented in the direction Y, the arrow AR designates the scanning direction. The image BSC is thus acquired in the plane of the array (Bscan). The image ESC is a section through the volume scanned by the beam emitted by the array ARR in a direction orthogonal to the plane of the array ARR (elevation scan). The image CSC is a section orthogonal to the two planes of the previous images BSC and ESC indexed by the depth.

In FIG. 3, for reasons of clarity and without loss of generality, IM[J] being for example an image BSC for a given insonification angle, IM[I] is then for example an image ESC resulting from a section for scanning in a direction orthogonal to that permitting the acquisition of the image IM[I]. The array ARR is then positioned (and moved for the image IM[I]) according to Case 2, that is to say perpendicular to the plane of the image. According to the invention, a contour search module CNT receives the image data. The functioning of this contour search module CNT is advantageously based on the known principles of contour search corresponding to level transitions of the echographic signal corresponding to interfaces signifying the imaged environment. A person skilled in the art can choose a manual search either by passing round interest areas, or by drawing contours superimposed on interest areas of the echographic images. A person skilled in the art can also choose an automatic or semiautomatic search of the contours. He can be assisted by contour tracing assistance techniques, for example described generically in W. A. Barrett and E. N. Mortensen, "Interactive Segmentation with Intelligent Scissors", Graphical Models and Image Processing, 60, pp 349-384, 1998. A person skilled in the art also has available to him all the means of image presegmentation, contour extraction etc. Amongst the contour extraction means it is possible to cite for example the Canny, Shen, Deriche etc, filters. There is here a great diversity of possible choices. For implementing the invention, it is only necessary to obtain at the output of the contour search module CNT data for isolating a certain number of points of the image detected as belonging to significant transitions in the images and corresponding to interfaces present in the environment. These points then make it possible to define at least one interest area IA in the vicinity.

In fact, and optionally, the contours C[I] and C[J] consisting of the points detected as belonging to transitions can be enlarged. The purpose of this is to eliminate the estimation errors due to noise and tiling effects, to take into account the spatial spread due to the imperfect response of the acquisition system, to consider that the interfaces are not infinitely fine. In this case, the interest areas IA are defined by these enlarged contours.

Referring to FIG. 3, the contours C[I] and C[J] are sought and the interest areas IA[I] and IA[J] are defined on the two images IM[I] and IM[J]. The interest areas IA[I] and IA[J] are, in FIG. 3, the result of an enlarging of the detected contours C[I] and C[J]. This enlargement is intentionally exaggerated.

The interest areas IA[I] and IA[J] are then analyzed in an analysis module ANA. In a first embodiment of the invention, the analysis step ANA sets out to determine the similarity of the presences of contours on the various images. The purpose of the analysis step ANA is then to determine the superimposition of the interest areas on the various images. In FIG. 3, and to simplify the explanation, the interest areas resulting from this search IA[I] and IA[J] (detected on the images IM[I] and IM[J]) are depicted in superimposition on the images IM[I] and IM[J] (dotted lines). The points common to the interest areas detected on each image are therefore sought. When interest areas are superimposed, the contour contained in these interest areas has been detected on the two images and the two interest areas can therefore be combined by granting equal weights to these points. The points belonging to an interest area detected on an image and not to an interest area on the other image are allocated a maximum weight on the image where the interest area has been detected and minimum for the other image. The weighting is then defined pixel by pixel of the interest area. Thus, if n images are processed, 2 to the power of n choices will be possible for each pixel. It is possible for example to decide to allocate an almost zero weight in the absence of interest areas and a weight of 1 in the contrary case. For example, the following table presents the allocation of weights for a combination of two images. The first two columns define by 0 and 1 the belonging of a pixel to each of the two interest areas. W represents the weight and P the standardized weights, a being a real compromise between 0.5 and 1.

| IA[I] | IA[J] | W[I] | W[J] | $P[I] = \frac{W[I]}{W[I] + W[J]}$ | $P[J] = \frac{W[J]}{W[I] + W[J]}$ |
|---|---|---|---|---|---|
| 1 | 1 | $0.5 < \alpha \leq 1$ | $0.5 < \alpha \leq 1$ | 0.5 | 0.5 |
| 1 | 0 | $0.5 < \alpha \leq 1$ | $0 \leq 1 - \alpha < 0.5$ | $0.5 < \alpha \leq 1$ <br> 1 if $\alpha = 1$ | $0 \leq 1 - \alpha < 0.5$ <br> 0 if $\alpha = 1$ |
| 0 | 1 | $0 \leq 1 - \alpha < 0.5$ | $0.5 < \alpha \leq 1$ | $0 \leq 1 - \alpha < 0.5$ <br> 0 if $\alpha = 1$ | $0.5 < 60 \leq 1$ <br> 1 if $\alpha = 1$ |
| 0 | 0 | $0 \leq 1 - \alpha < 0.5$ | $0 \leq 1 - \alpha < 0.5$ | 0.5 | |

The value of the corresponding pixel in the combination image is then equal to:

$$IM_C = \frac{W[I] \cdot IM[I] + W[J] \cdot IM[J]}{W[I] + W[J]} = P[I] \cdot IM[I] + P[J] \cdot IM[J]$$

This equation can be generalized to any integer number n of images. The last line in the table in fact describes the conventional case of areas outside interest areas and therefore the conventional spatial combination of images. A weight map can thus be obtained for the interest areas IA and for the areas outside interest areas denoted IM-IA. The weight map can therefore be defined on the entire image.

In a particularly advantageous embodiment, the analysis step ANA determines a confidence index for a contour on each of the images where it has been detected. This makes it possible to establish a scale between the images according to the quality of the contour. This embodiment uses the results of the contour similarity study. Non-constant weights on the points in the interest area (for example other than 0 and 1) can then be allocated according, for example, to the contrast observed on the images to be combined or on any other confidence measurement. These weights are then dependent on the position of the pixel or voxel in question. This contrast is determined using conventional means by calculation of quantities (such as the gradient or derivative for example) on the image and then comparison of these quantities on the various points of the interest areas which are similar from one image to another. In the example in FIG. 3, the points on the contour which belong to the two interest areas are more contrasted (depicted by a broader line) on the image M[J]. This difference in contrast can be detected by a gradient calculation for example and then a comparison between the two images. The assessment of the contrast can also be left to a user, who can then choose one or more images which he judges to have the best contrast. Thus the points on the image IM[J] are allocated greater weights on the common area than the corresponding points on the image IM[I]. The best contrast observed on the contour can, for example, come from a better reflection of the ultrasonic waves due to an angle of emission of the ultrasonic beam which is better adapted to the interface represented by said contour. This interface is for example a change in tissue in the environment observed. Finally, in order to preserve a better visual impression during the observation of the combination image IMc, the images with standardized weights P[I] and P[J] can be smoothed before the calculation of IMc so as to produce a visually more continuous combination.

In the preferred embodiment of the invention, the analysis step ANA also uses an evaluation of the resolution on the interest areas of the images to be combined. This embodiment uses the results of the contour similarity study. On the various images where the common interest areas have been detected, an evaluation of the resolution can be used for calculating the weights. This is advantageous when the images to be combined do not have the same resolution. This is for example the case with two images issuing from the same section of two echographic volumes acquired with two orthogonal directions of movement of the probe ARR as illustrated in FIG. 4: one of the images then corresponds to an image of the BSC type and is well resolved, the other image corresponding to an image of the ESC type and is coarser. In the general case, the images to be combined are acquired with a linear array of transducers oriented successively in several different directions during various acquisitions of the echographic volumes of one and the same environment. In this case, the transfer function resulting from an echo of an ultrasonic beam on one point (the response of the system to a pulse called Point Spread Function) is highly anisotropic.

FIGS. 5a and 5b depict two sections of the transfer function of the imaging system, seen in two particular cutting planes. To simplify the explanations, two echographic volumes acquired with orthogonal movements of the linear array are considered. It is chosen to observe two same sections of each of these two volumes. The first section is perpendicular to the movement of the probe used for acquiring the first volume. The second section is parallel to the movement of the probe used for acquiring the second volume. Referring to FIG. 3 the first section is a section of the BSC type acquired in the plane of the probe (see FIG. 5a) and the second section is a section of the ESC type acquired in a plane orthogonal to the plane of the probe (see FIG. 5b). The two FIGS. 5a and 5b illustrate, for the same cutting plane of the imaged environment, the associated resolution of the images for the various points on the planes studied. These functions, resulting from the echo on a point, depend on the depth. A minimum echo degradation E2 is situated in the focusing plane where a point 2 is situated, at the center of the spot. The echoes E1 and E3 on points 1 and 3, situated at the center of the spots E1 and E3, have a less good resolution than that of the echo E2 of a point situated in the focusing plane. It should also be noted that these functions, which represent the same plane of the environment but come from two acquisitions of the environment with different directions of movement of the probe, are different. They illustrate the degradation of the images acquired and interpolated by a scanning of an environment studied by means of a linear array of transducers. The lateral resolution is in fact better for this FIG. 5a since it corresponds to the response of the imaging system in the plane of the array. This resolution reaches its maximum degradation in the plane orthogonal to the plane of the array, as illustrated in FIG. 5b. The combination of these images therefore mixes various spatial resolutions. The result is an image having a more isotropic resolution. However, the overall resolution is less good than that of FIG. 5a. According to the invention, it may thus be advantageous to favor the image 5a acquired in the plane of the array ARR compared with the one 5b acquired by section in a direction perpendicular to the array ARR. Thus a better overall resolution will be obtained. Thus, according to the invention, which consists of allocating to areas of certain images a greater importance in the combination, greater weights are advantageously allocated to the similar interest areas detected within images acquired in the plane of the array compared with the corresponding interest areas detected on the images acquired by interpolation after a scanning in a direction parallel to the plane of the image.

FIGS. 6a and 6b describe the above process in a more general context if the combination is carried out using acquisitions made with any directions of movement of the array and in any cutting plane. According to the preferred embodiment of the invention, a weight is allocated which is all the greater, the better the resolution. This amounts to allocating a greater weight to the points of an acquisition when the latter is closer to a section of the BSC type. Referring to FIG. 6 and for a given volume, it is for example possible to allocate a weight equal to the absolute value of the cosine of the angle made between the cutting plane of the image PC and a section of the BSC type. According to the invention, it is sought to preserve the contrast on the interest areas having transitions and to effect an averaging in the parts of the observed environment not containing any anatomical structures. In the parts where the interest areas IA are superimposed (see for example FIG. 3), the contour contained in these interest areas has been detected on the two images and the two interest areas can therefore be combined by granting to these points weights representing the proximity of the section observed to a section of the BSC type. For example, the following table presents the allocation of weights for a combination of two images issuing from two volumes acquired according to the configurations described in FIGS. 6a and 6b (acquisitions A and B). PC represents the cutting plane to be imaged, $\theta_A$ is the angle between PC and a cutting plane of the BSC type for the acquisition A and $\theta_B$ is the angle between PC and a cutting plane of the BSC type for the acquisition B. The first two columns in the table define by 0 and 1 the belonging of a pixel to each of the two interest areas. W represents the weight and P the standardized weights, $\alpha$ being a real compromise between 0.5 and 1.

nation image $IM_C$ is observed, the images of weight W[I] and W[J] or the images of standardized weight P[I] and P[J] can be smoothed before the calculation of IMc so as to produce a more visually continuous combination.

In conclusion, the analysis step ANA therefore advantageously includes means of determining the quality of a contour according to several criteria which may be independent or combined with each other. These criteria therefore include, for example, a detection of the similarity of interest areas, a study of contrast of contours, a study of the resolution and any other possible criterion for judging the quality of a contour representing an interface. It will be understood clearly here that the image combination takes the best of each of the images in order to form the global image IMc illustrated in FIG. 3. The weightings are carried out so that the best data are favored in the presence of anatomical structures detected as contours, so that no anatomical structure is lost and so that, outside areas where structures are present, the image is of good quality. This is because, taking the average of the images over the areas outside interest areas makes it possible to average the noise and therefore to reduce it. The principle according to the invention can be extended to any integer number of images.

In a particular embodiment of the invention, modification of the weights is offered to the user, who can choose to give a greater importance to a particular image for a given interest area, said particular image being judged to have the best quality. In particular, the intervention of an expert may be particularly useful for judging the best contrast. The visual result can then be assessed and refined by a user, who will judge on the final quality of the combination image and will modify the weights according to his perception.

The weight maps W[I], W[J] finally obtained are then used in a combination module CC which effects the weighted addition of the various interest areas and the points corresponding to said interest areas when they are not similar from one image to another. Outside the interest areas of the various images to be combined, a conventional combination as known to persons skilled in the art is carried out. The combination image IMc is then finally obtained at the output of the processor.

| IA[I] | IA[J] | W[I] | W[J] | $P[I] = \dfrac{W[I]}{W[I]+W[J]}$ | $P[J] = \dfrac{W[J]}{W[I]+W[J]}$ |
|---|---|---|---|---|---|
| 1 | 1 | $\alpha \cdot \lvert\cos\theta_I\rvert$ $0.5 < \alpha \leq 1$ | $\alpha \cdot \lvert\cos\theta_J\rvert$ $0.5 < \alpha \leq 1$ | $\dfrac{\lvert\cos\theta_I\rvert}{\lvert\cos\theta_I\rvert + \lvert\cos\theta_J\rvert}$ instead of 0.5 | $\dfrac{\lvert\cos\theta_J\rvert}{\lvert\cos\theta_I\rvert + \lvert\cos\theta_J\rvert}$ instead of 0.5 |
| 1 | 0 | $0.5 < \alpha \leq 1$ | $0 \leq 1-\alpha < 0.5$ | $0.5 < \alpha \leq 1$ 1 if $\alpha = 1$ | $0 \leq 1-\alpha \leq 0.5$ 0 if $\alpha = 1$ |
| 0 | 1 | $0 \leq 1-\alpha < 0.5$ | $0.5 < \alpha \leq 1$ | $0 \leq 1-\alpha < 0.5$ 0 if $\alpha = 1$ | $0.5 < \alpha \leq 1$ 1 if $\alpha = 1$ |
| 0 | 0 | $0 \leq 1-\alpha < 0.5$ | $0 \leq 1-\alpha < 0.5$ | 0.5 | 0.5 |

The value of the pixel corresponding to the combination image is given by the equation:

$$IM_C = \frac{W[I] \cdot IM[I] + W[J] \cdot IM[J]}{W[I] + W[J]} = P[I] \cdot IM[I] + P[J] \cdot IM[J]$$

Thus this weighting makes it possible to favor the best resolved data, not to lose information on the transitions and once again to average the areas without structures. Finally, in order to preserve a better visual impression when the combi- Advantageously, means of improving the image can be used independently of the invention (in particular and for example the techniques of deblurring and enhancement).

The invention has been described for combinations of images in two dimensions. It has been seen which type of two-dimensional images can be combined (with different angular beam orientations and with different scanning orientations of the array for the same image plane). It is then possible to reconstruct a volume in three dimensions from combined two-dimensional images if the latter are available in at least two directions in space. This amounts simply to processing several cutting planes evenly so as to generate a reconstructed 3D space. It is also possible to reconstruct cutting planes "on the fly", for example, only the section requested by the display module controlled by the operator. In this case, it is then advantageous to introduce the resolution amongst the criteria of calculation of the weights associated with the various images intersected by this cutting plane. It can also be envisaged applying the principles of the invention to a spatial combination of volumes. In which case, the contour search step detects surfaces in the volumes and the analysis step awaits the points in interest areas which are interest volumes. The principles according to the invention can then be generalized to other types of combination of images and to other types of image.

There are many ways of implementing the functions presented in the means and steps of the method according to the invention by software and/or hardware means accessible to persons skilled in the art. This is why the figures are schematic. Thus, although the Figs. show various functions fulfilled by various units, this does not exclude a single software and/or hardware means making it possible to fulfill several functions. Nor does this exclude a combination of software and/or hardware means making it possible to fulfill a function.

Although this invention has been described in accordance with the embodiments presented, a person skilled in the art will immediately recognize that there exist variants to the embodiments presented and that these variants remain within the spirit and scope of the present invention. Thus many modifications can be made by a person skilled in the art without for all that being excluded from the spirit and scope defined by the following claims.

The invention claimed is:

1. A method for combining ultrasonic images of the same object, the method including:
    for each ultrasonic image, seeking a contour representing an interface on the ultrasonic image;
    identifying an interest area in each ultrasonic image, the interest area being an enlarged area around the contour;
    assigning weights to pixels in the interest areas of the ultrasonic images; and
    constructing a combination image from the ultrasonic images, a pixel of the combination image corresponding to a pixel within at least one interest area being obtained from a weighting of the corresponding pixels of the ultrasonic images according to the weights assigned to the corresponding pixels,
    wherein the weights are assigned such that when a pixel is within the interest area of more than one of the ultrasonic images, equal weights are assigned to the corresponding pixels for each ultrasonic image for which the pixel is within the interest area, and
    wherein the weights are assigned such that when a pixel is within the interest area of a first one of the ultrasonic images, but not within the interest area of a second one of the ultrasonic images, then the weight assigned to the corresponding pixel of the first ultrasonic image is greater than the weight assigned to the corresponding pixel of the second ultrasonic image.

2. A method as claimed in claim 1, wherein assigning the weights comprises estimating the contrast within at least two interest areas present and similar on at least two of the ultrasonic images, the weights being assigned to the various pixels in said interest areas according to said estimated contrast.

3. The method of claim 2, wherein the contrast is determined individually for each pixel within each interest area of each ultrasonic image, and the weight assigned to each pixel depends on the individual contrast for that pixel.

4. The method of claim 3, wherein determining the contrast individually for each pixel within each interest area comprises determining a gradient at the pixel.

5. A method as claimed in claim 1, wherein at least two of the ultrasonic images have different resolutions and assigning the weights includes evaluating these resolutions within at least two interest areas present and similar on at least two of said ultrasonic images, the weights being assigned to the pixels in said interest areas on said at least two ultrasonic images according to said resolutions.

6. The method of claim 1, wherein the weights are assigned such that when a pixel is within the interest area of a first one of the ultrasonic images, but not within the interest area of a second one of the ultrasonic images, then the weight assigned to the corresponding pixel of the first ultrasonic image and the weight assigned to the corresponding pixel of the second ultrasonic image are each greater than zero.

7. The method of claim 6, wherein the weights are assigned such that when a pixel is within the interest area of a first one of the ultrasonic images, but not within the interest area of a second one of the ultrasonic images, then the weight assigned to the corresponding pixel of the first ultrasonic image and the weight assigned to the corresponding pixel of the second ultrasonic image are each less than one.

8. The method of claim 1, wherein the weights are assigned such that when a plurality of pixels are within the interest area of a first one of the ultrasonic images, but not within the interest area of a second one of the ultrasonic images, then the weights assigned to the plurality of corresponding pixels of the first ultrasonic image that are within the interest area are not all the same as each other, and the weights assigned to the corresponding pixels of the second ultrasonic image that are not within the interest area are not all the same as each other.

9. A method for combining ultrasonic images of the same object, the method including:
    obtaining a first ultrasonic image of the object with an ultrasonic array aligned in a first direction and scanned in a second direction perpendicular to the first direction so as to define a first reference plane which is coplanar with the first direction and perpendicular to the second direction, the first ultrasonic image lying in a first image plane having a first angle with respect to the first reference plane;
    obtaining a second ultrasonic image of the object by with the ultrasonic array aligned in a third direction and scanned in a fourth direction perpendicular to the third direction so as to define a second reference plane which is coplanar with the third direction and perpendicular to the fourth direction, the second ultrasonic image lying in a second image plane having a second angle with respect to the second reference plane;
    for each of the first and second ultrasonic images, seeking a contour representing an interface on the ultrasonic image;
    identifying an interest area in each ultrasonic image, the interest area being an enlarged area around the contour;
    assigning weights to pixels in the interest areas of the ultrasonic images; and
    constructing a combination image from the ultrasonic images, a pixel of the combination image corresponding to a pixel within at least one interest area being obtained from a weighting of the corresponding pixels of the ultrasonic images according to the weights assigned to the corresponding pixels, wherein the weights are assigned such that when a pixel is within the interest area of the first ultrasonic image and within the interest area of the second ultrasonic image, then the weight assigned to the corresponding pixel in the interest area of the first ultrasonic image is a function of the first angle, and the weight assigned to the corresponding pixel in the interest area of the second ultrasonic image is a function of the second angle.

10. The method of claim 9, wherein the weights are assigned such that when a pixel is within the interest area of the first ultrasonic image, but not within the interest area of the second ultrasonic image, then the weight assigned to the corresponding pixel of the first ultrasonic image is greater than the weight assigned to the corresponding pixel of the second ultrasonic image.

11. The method of claim 9, wherein the weight assigned to the corresponding pixel in the interest area of the first ultrasonic image is a function of a cosine of the first angle, and the weight assigned to the corresponding pixel in the interest area of the second ultrasonic image is a function of a cosine of the second angle.

12. The method of claim 9, wherein the weight assigned to the corresponding pixel in the interest area of the first ultrasonic image increases as the first angle increases, and the weight assigned to the corresponding pixel in the interest area of the second ultrasonic image increases as the second angle increases.

* * * * *